United States Patent
Nichols

(10) Patent No.: US 9,411,606 B1
(45) Date of Patent: *Aug. 9, 2016

(54) BASEBOARD MANAGEMENT CONTROLLER (BMC) PROVIDED WITH SENSOR LIST

(71) Applicant: International Business Machines Corporation, Armonk, NY (US)

(72) Inventor: Roger W. Nichols, Middlesex, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/059,766

(22) Filed: Mar. 3, 2016

Related U.S. Application Data

(63) Continuation of application No. 14/885,497, filed on Oct. 16, 2015.

(51) Int. Cl.
*G06F 9/44* (2006.01)

(52) U.S. Cl.
CPC ............ *G06F 9/4411* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 2006/0158325 | A1* | 7/2006 | Cha | H04L 67/125 340/521 |
| 2006/0206286 | A1* | 9/2006 | Mugunda | G06F 13/102 702/182 |
| 2012/0110308 | A1 | 5/2012 | Chen | |
| 2012/0173858 | A1* | 7/2012 | Ayanam | G06F 9/4411 713/2 |
| 2012/0278509 | A1* | 11/2012 | Zhang | G06F 8/665 710/8 |
| 2013/0124709 | A1* | 5/2013 | Shah | H04L 49/357 709/223 |
| 2014/0195794 | A1 | 7/2014 | Lou et al. | |

OTHER PUBLICATIONS

List of IBM Patents or Patent Applications Treated as Related; (Appendix P), Filed Oct. 16, 2015; 2 pages.
Roger W. Nichols, "Baseboard Management Controller (BMC) Provided With Sensor List", U.S. Appl. No. 14/885,497, filed Oct. 16, 2015.

* cited by examiner

*Primary Examiner* — Kim Huynh
*Assistant Examiner* — Vincent Chang
(74) *Attorney, Agent, or Firm* — Cantor Colburn LLP; Richard Wilhelm

(57) ABSTRACT

A system for baseboard management controller (BMC) operation is provided. The system includes a computing system including hardware on which an operating system is operable and sensors disposed to sense various attributes of the hardware and a BMC. The BMC is disposed in signal communication with the computing system and is bootable and operative independent of an execution of the operating system. Upon boot initialization of the BMC, the BMC includes an empty reserved database, issues to the computing system a query for a list of the sensors and builds and populates in the reserved database a sensor attribute repository in accordance with sensor data received from the computing system in response to the query and sensor attribute data associated with the sensor data.

1 Claim, 5 Drawing Sheets

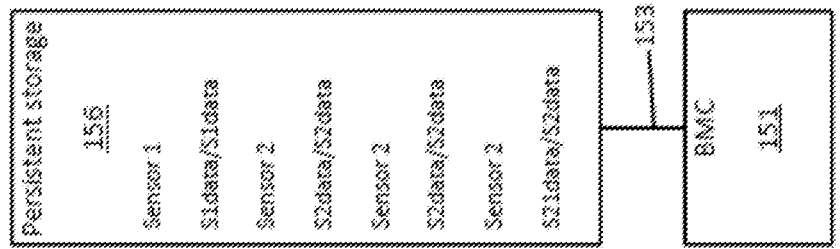
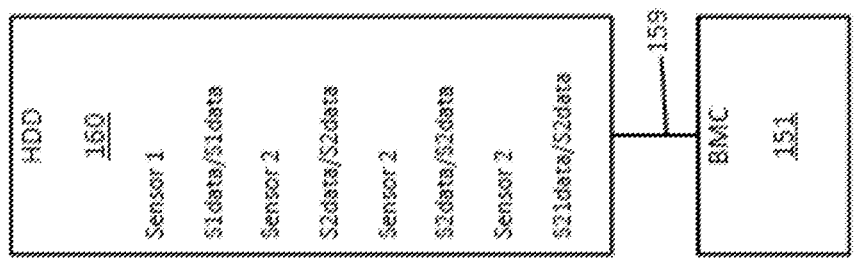
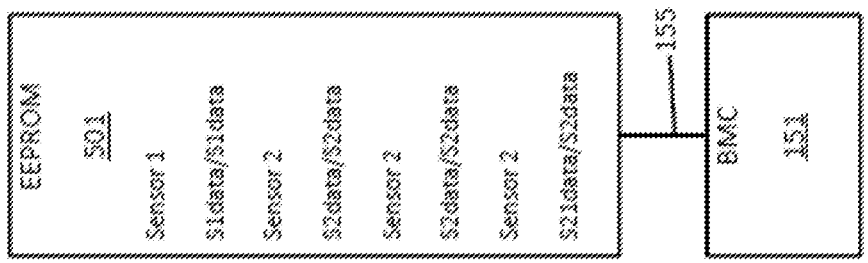

BASEBOARD MANAGEMENT CONTROLLER (BMC) PROVIDED WITH SENSOR LIST

CROSS-REFERENCE TO RELATED APPLICATION

This application is a continuation of and claims the benefit of priority to U.S. application Ser. No. 14/885,497, which was filed on Oct. 16, 2015. The entire contents of U.S. application Ser. No. 14/885,497 are incorporated herein by reference.

BACKGROUND

The present invention relates to baseboard management controllers (BMC) and, more specifically, to a provision of an external list of sensors on a platform to a BMC.

In computing, a BMC is a specialized service processor that monitors the physical state of a computer, network server or other hardware device using sensors and by way of communications with system administrators through an independent connection. In some cases, the BMC is provided as a part or component of an intelligent platform management interface (IPMI) and may be configured in the motherboard or main circuit board of the device to be monitored.

The sensors of a BMC generally measure internal physical variables. These include, but are not limited to, temperature, humidity, power-supply voltage, fan speeds, communications parameters and operating system (OS) functions. If, as a result of the measurements, it is determined that any of these variables stray outside specified limits, the system administrators are or may be notified so that corrective action can be taken. The monitored device can be power cycled or rebooted as necessary. In this way, a single administrator can remotely manage numerous servers and other devices simultaneously, saving on the overall operating cost of the network and helping to ensure its reliability.

When a BMC boots, the BMC needs a list of sensors and sensor attributes to build its associated sensor data repository. Currently, this is achieved by inclusion of the sensors and attributes in the BMC source code. However, this leads to required updates to program code every time a platform is revised.

SUMMARY

According to an embodiment of the present invention, a system for baseboard management controller (BMC) operation is provided. The system includes a computing system including hardware on which an operating system is operable and sensors disposed to sense various attributes of the hardware and a BMC disposed in signal communication with the computing system. The BMC is bootable and operative independent of an execution of the operating system and which, upon boot initialization, includes a reserved database that is empty, issues to the computing system a location and power query for a list of the sensors, upon receiving a response from the computing system including a list of the sensors, issues a second query for a list of sensor attributes for each of the sensors listed in the list of the sensors, loads the list of sensor attributes for each of the sensors listed in the list of the sensors as sensor data and builds and populates in the reserved database a sensor attribute repository in accordance with the sensor data received from the computing system in response to the location and power query and the second query and in accordance with sensor attribute data associated with the sensor data.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a schematic diagram of a computing system including a BMC communicative with an electrically erasable programmable read-only-memory (EEPROM) device;

FIG. 6 is a schematic diagram of a computing system including a BMC communicative with at least one or more of a local high-level management entity, a local shelf manager and a local policy host; and FIG. 7 is a schematic diagram of a computing system including a BMC communicative with at least one or more of a remote high-level management entity, a remote shelf manager and a remote policy host.

DETAILED DESCRIPTION

As will be described below, a list of sensors on a platform is provided to a BMC from an external source. The BMC then queries the sensor list during boot time to load the sensor list and sensor parameters (e.g., discrete with states, analog with ranges, etc). This allows a single management code to be reused across many platform revisions. The provision of the external list of the sensors effectively separates the BMC from the sensor data and provides for easier maintenance and lower platform revision costs. In accordance with embodiments, the sensor data could be embodied on a physical device, such as an electrically erasable programmable read-only-memory (EEPROM) device, which is queried during boot time or the BMC can retrieve its sensor data from a higher level management entity, a shelf manager or a policy host. In any case, since there is a separation of data and code, the BMC code does not need revisions due to the managed device changing due to the details relating to the managed device's sensors being stored or provided by a separate entity.

Figure 1:
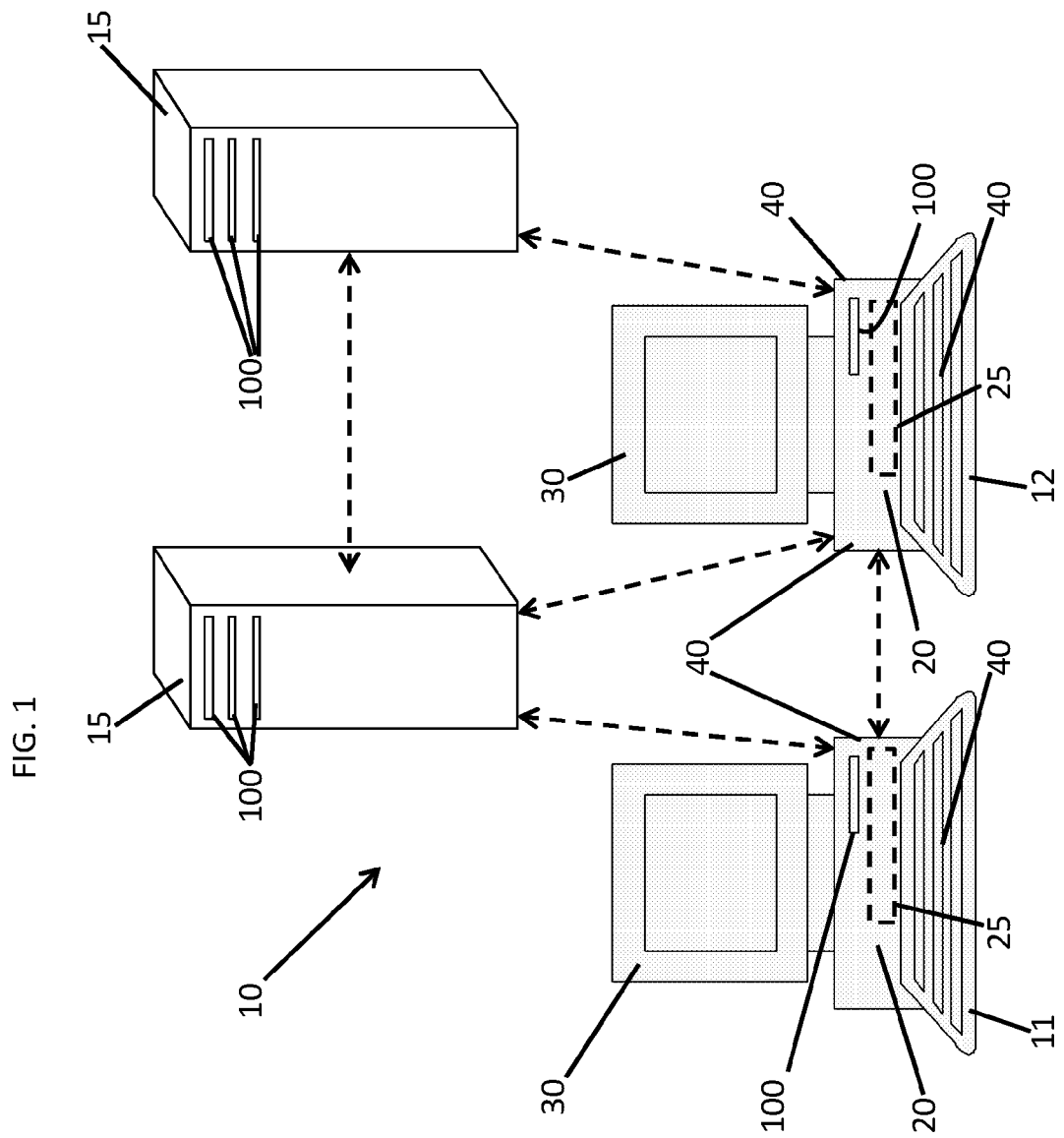
FIG. 1 is a schematic diagram of a computing system in accordance with embodiments.

With reference to FIG. 1, a computing system 10 is provided and may be configured for example as an enterprise computing system or as a personal computing system. In either case, the computing system 10 includes hardware, such as at least first computing device 11 and second computing device 12. First and second computing devices 11 and 12 are configured to be networked together for communication purposes and thus are disposable in signal communication with each other. It will be understood, of course, that additional hardware/computing devices, such as central or remote servers 15, could be provided in the computing system 10.

Figure 2:
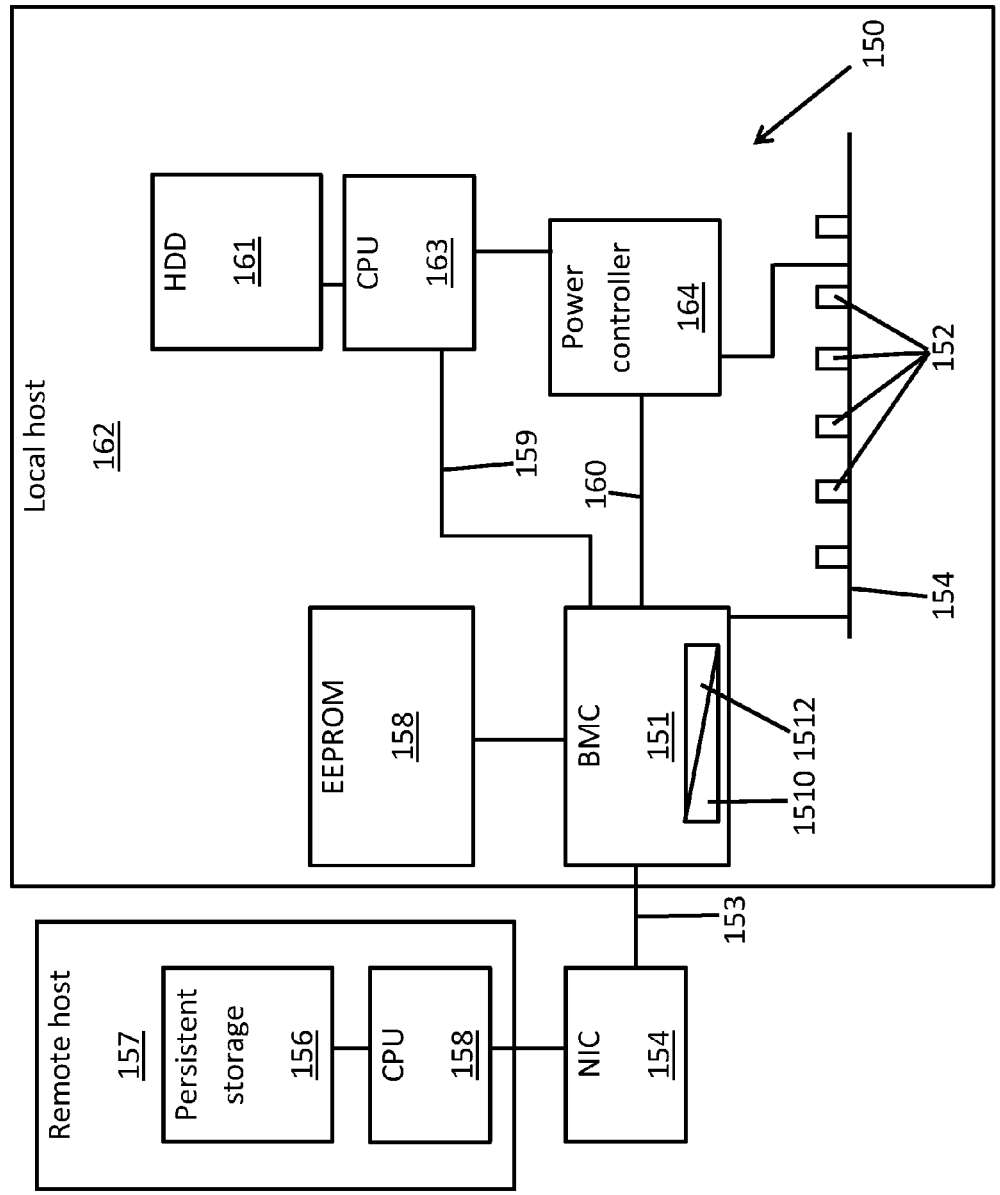
FIG. 2 is a schematic diagram of interfaces to a baseboard management controller (BMC) in an intelligent platform management interface (IPMI) in accordance with embodiments.

Each of the first and second computing devices 11 and 12 and each of the servers 15 may include among other features a processing circuit 20, a memory unit 25, a display 30, user input devices 40 and a networking unit 50 as well as a computer program product 100 for operating a BMC (see FIG. 2).

The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit 50 may be provided as an Ethernet or other suitable networking device by which the first and second computing devices 11 and 12 are communicative with each other.

With reference to FIG. 2, at least one of the first and second computing devices 11 and 12 or at least one of the servers 15 is configured to include and to enable an intelligent platform management interface (IPMI) sub-system. This IPMI sub-system provides for out-of-band or side-band management and monitoring capabilities of the computing system 10 independently of various operations of any of the hardware of the computing system 10. For example, the IPMI sub-system can use a standardized interface and protocol to manage the operations of the servers 15 and can be employed by systems administrators to manage a system remotely in the absence of an operating system or in the absence of the system management software. In some cases, those system administrators can use the IPMI sub-system to monitor platform status, such as system temperatures, voltages, fans, power supplies and chassis intrusion, to query inventory information, to review hardware logs of out-of-range conditions and/or to perform recovery procedures such as issuing requests from a remote console. Generally, however, the IPMI sub-system can communicate with the hardware (i.e., the servers 15) via direct out-of-band local area network (LAN) or serial connections or via side-band local area network (LAN) connections to a remote client. In the latter case, side-band LAN connections may utilize board network interface controllers (NIC).

As shown in FIG. 2, an IPMI sub-system 150 of at least one of the servers 15, for example, includes the BMC 151 and may include other management controllers distributed among different system modules that may be referred to as satellite controllers. The satellite controllers within a same chassis may connect to the BMC 151 via a system interface (e.g., an intelligent platform management bus/bridge (IPMB) or an implementation of an inter-integrated circuit ($I^2C$) or another similar circuit). The BMC may connect to satellite controllers or another BMC in another chassis via a system bus or bridge interface (e.g., an intelligent platform management controller (IPMC) bus or bridge) or the BMC may be managed remotely (e.g., with a remote management control protocol (RMCP) or another specialized wire protocol).

In any case, the BMC 151 is the intelligence in the IPMI sub-system 150 and may be provided as a specialized microcontroller embedded on the motherboard of the at least one of the servers 15. The other components of the IPMI sub-system 150 include different types of sensors 152 that sense various attributes of the at least one server 15 and then report to the BMC 151 on parameters, such as temperature, cooling fan speeds, power status, operating system (OS) status, etc., relating to the sensing. The BMC 151 monitors the sensors 152 and can send alerts to the system administrators if any of the parameters do not stay within preset limits. The system administrators can also remotely communicate with the BMC 151 to take corrective actions, such as resetting or power cycling the computing system 10.

Physical interfaces to the BMC 151 include SMBus buses 153, $I^2C$ buses 154 and serial peripheral interface (SPI) buses 155. The SMBus buses 153 can be used to connect an NIC 154, for example, to the BMC 151 in a case where the BMC 151 is communicative with persistent storage 156 on a remote host 157 by way of a central processing unit (CPU) 158 of the remote host 157. The $I^2C$ buses 154 provide for communications between the sensors 152 and the BMC 151. The SPI buses 155 provide for communication between an EEPROM device 158 and the BMC 151. Additional serial buses 159 and 160 may also be provided to permit communication between the BMC 151 and a hard disk drive (HDD) 161 of a local host 162 by way of a CPU 163 of the local host 162 and between a power controller 164 of the local host 162 and at least the BMC 151.

Figure 3:
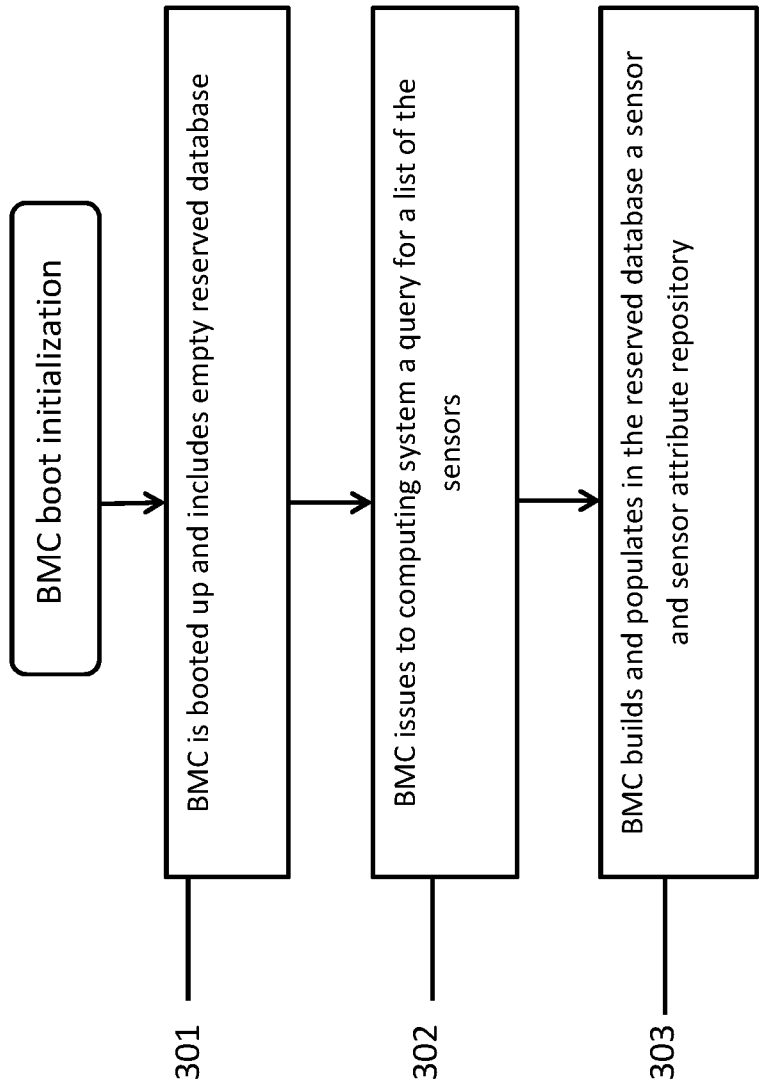
FIG. 3 is a flow diagram illustrating an operational method of the BMC of FIG. 2 in accordance with embodiments.

While conventional BMC implementations were characterized with the inclusion of sensors and attribute information in the BMC source code, which led to required updates to program code every time a platform is revised, the BMC 151 provided herein is bootable and operative independent of an execution of the operating system of the computing system 10 and which, upon BMC boot initialization, executes the following operational method with reference to FIG. 3. At initialization, at block 301, the BMC 151 is booted up and includes an empty reserved database 1510 (see FIG. 2). Subsequently, the BMC 151 issues to the computing system 10 a query for a list of the sensors 152 at block 302. At block 303, the BMC 151 builds and populates in the reserved database 1510 a sensor and sensor attribute repository 1512 (see FIG. 2) in accordance with sensor data received from the computing system 10 in response to the query and in accordance with sensor attribute data associated with the sensor data.

In accordance with embodiments, the query issued by the BMC 151 may be a shot-in-the-dark type of query issued along the various physical interfaces noted above. In any case, the query may include at least one or both of a location query and a power query. The location query may be provided as a query issued to the computing system 10 that requests sensor identification information and location information of the sensors 152 within the computing system 10. The power query is a type of a query that asks if the managed devices to which the sensors 152 are connected are powered. The location query and the power query may be issued together or in a reversible sequence.

Figure 4:
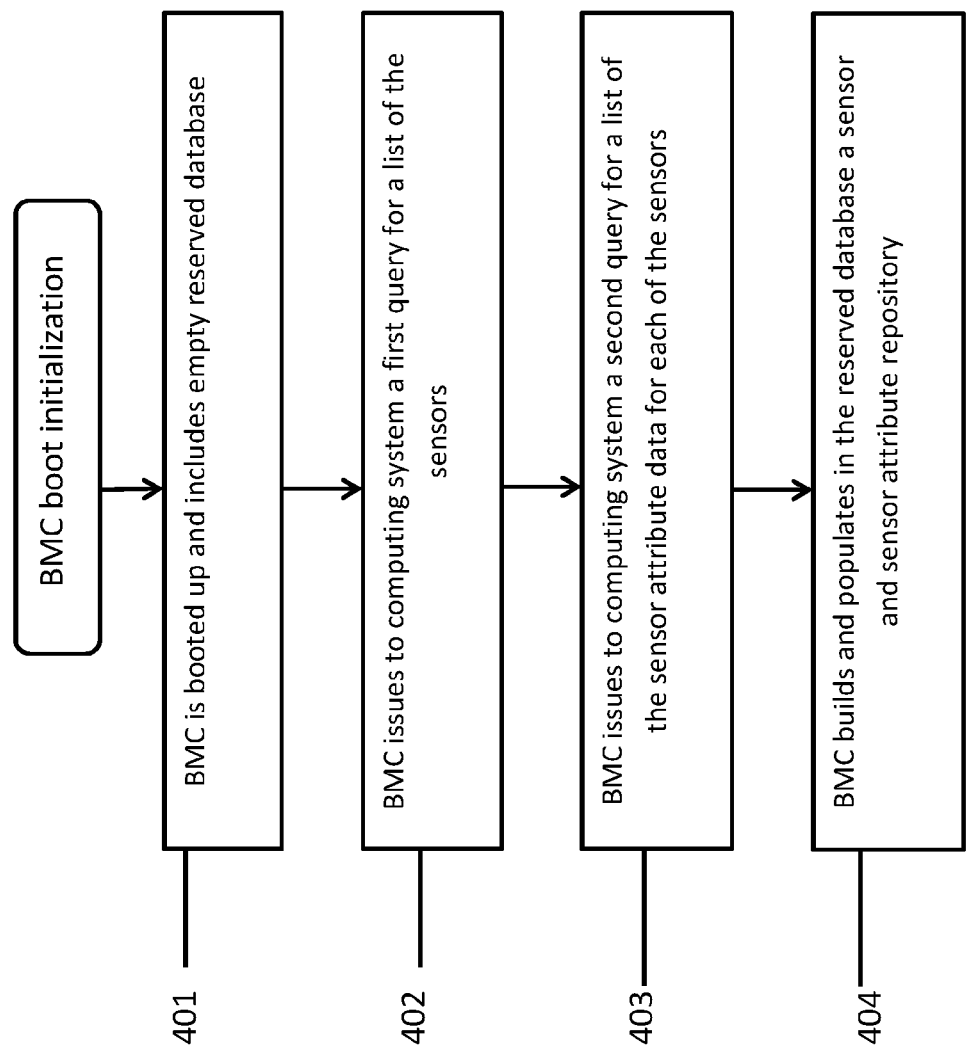
FIG. 4 is a flow diagram illustrating an operational method of the BMC of FIG. 2 in accordance with alternative embodiments.

In accordance with embodiments, the BMC 151 may be configured to load the sensor attribute data from the computing system 10 at block 304 of FIG. 3. That is, the BMC 151 may be configured with a program code command that instructs the BMC 151 to load the sensor attribute data from the computing system 10 upon receipt of the sensor data responsive to the query. In accordance with alternative embodiments, however, and with reference to FIG. 4, at block 401, the BMC 151 is booted up and includes an empty reserved database 1510 (see FIG. 2). Subsequently, the BMC 151 issues to the computing system 10 a first query for a list of the sensors 152 at block 402. Following the response of the computing system 10 to the first query, the BMC 151 issues a second query to the computing system at block 403. This second query is a query for the sensor attribute data for each sensor associated with the sensor data received in response to the first query. At block 404, the BMC 151 builds and populates in the reserved database 1510 a sensor and sensor attribute repository 1512 (see FIG. 2) in accordance with sensor data received from the computing system 10 in response to the first query and sensor attribute data received from the computing system 10 in response to the second query.

With reference to FIGS. 5-7, particular embodiments of the BMC 151 and associated hardware will now be described.

As shown in FIG. 5, the computing system 10 may include an electrically erasable programmable read-only-memory (EEPROM) device 501, which is connectable and communicative with the BMC 151 by way of one or more of the SPI bus 155. The EEPROM device 501 may be provided with a database of sensor identification data for the sensors 152 and with parameter information data. This parameter information data may describe, for example, the expected parameters normally associated with proper operations of the computing system. As such, if the BMC 151 determines that one of the sensors 151 gives a reading that is outside of the ranges established by the parameters, the BMC 151 can take corrective action or send an alert to the system administrators.

As shown in FIG. 6, the computing system 10 may include at least one or more of a local high-level management entity, a local shelf manager and a local policy host (hereinafter referred to as the "local host" 161). The local host 161 is connectable and communicative with the BMC 151 by way of one or more of the additional buses 159 and 160 and may include the HDD 160. In such cases, the HDD 160 may be provided with a database of sensor identification data for the sensors 152 and with parameter information data similar to the parameter information data noted above.

As shown in FIG. 7, the computing system 10 may include at least one or more of a remote high-level management entity, a remote shelf manager and a remote policy host (hereinafter referred to as the "remote host" 157). The remote host 157 is connectable and communicative with the BMC 151 by way of one or more of the SMBus buses 153 and the NIC 154. In such cases, the persistent storage 156 of the remote host 157 may be provided with a database of sensor identification data for the sensors 152 and with parameter information data similar to the parameter information data noted above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for baseboard management controller (BMC) operation, the system comprising:
a computing system including hardware on which an operating system is operable and sensors disposed to sense various attributes of the hardware; and
a BMC disposed in signal communication with the computing system, the BMC being bootable and operative independent of an execution of the operating system and which, upon boot initialization:
includes a reserved database that is empty;
issues to the computing system a location and power query for a list of the sensors;
upon receiving a response from the computing system including a list of the sensors, issues a second query for a list of sensor attributes for each of the sensors listed in the list of the sensors;
loads the list of sensor attributes for each of the sensors listed in the list of the sensors as sensor data; and
builds and populates in the reserved database a sensor attribute repository in accordance with the sensor data received from the computing system in response to the location and power query and the second query and in accordance with sensor attribute data associated with the sensor data.

* * * * *